Jan. 31, 1939.  A. J. CORRIEZ  2,145,342
RADIO WAVE MEASURING DEVICE
Filed Oct. 23, 1935
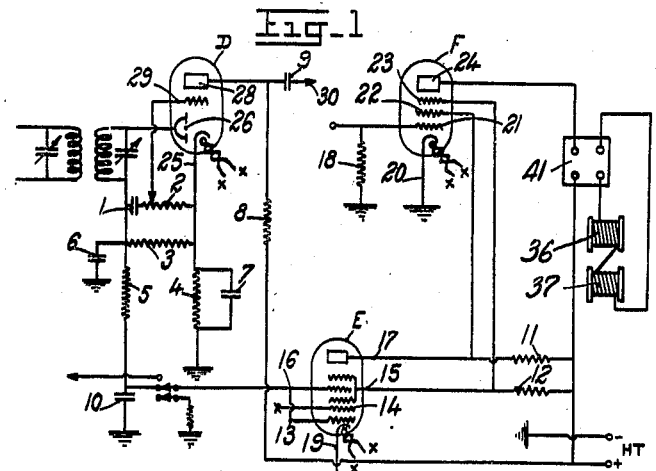
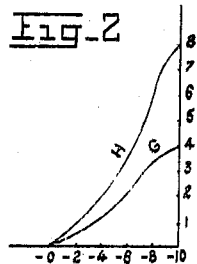
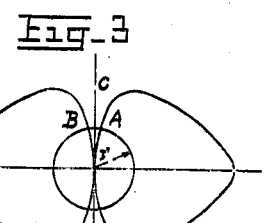
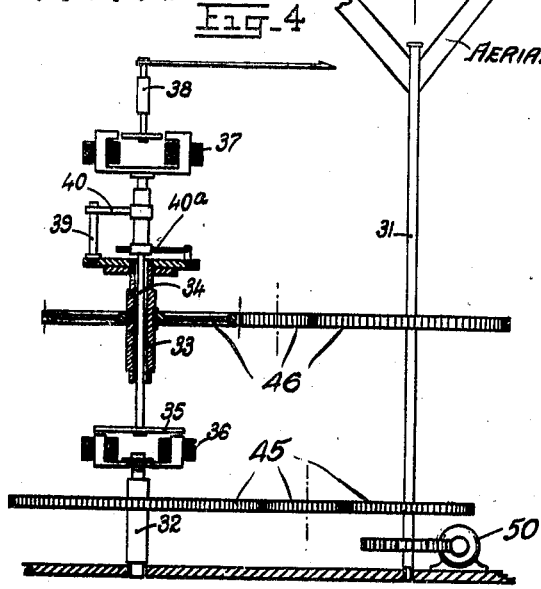
A. J. Corriez
INVENTOR
By Glascock Downing & Seebold
Attys.

Patented Jan. 31, 1939

2,145,342

UNITED STATES PATENT OFFICE 2,145,342

RADIO WAVE MEASURING DEVICE

André Jacques Corriez, Paris, France

Application October 23, 1935, Serial No. 46,372
In France October 25, 1934

1 Claim. (Cl. 250—11)

The present invention relates to a device for measuring the direction of a source of transmission of radio-electric waves with respect to a radio receiver.

The said device makes it possible to determine and to locate any sources of transmission, even when spaced apart by a very small angle.

It also provides for direct reading and for registering the direction with great precision.

The device will operate even in the case of a transmission of modulated continuous waves, as the variations due to the modulation will cause no interference in the measurements.

The device may effect the measurements either when mounted as a stationary installation, or as a movable installation as, for instance, on a vehicle, an aeroplane or a vessel, and the transmission to be measured may be either stationary or movable.

The aerial employed acts upon the high frequency portion of a radio receiver, according to any usual arrangement of circuits. The system of receiving and amplification of the high frequency current may also be of any kind.

The principle of the invention consists in making use of a rotating aerial receiving thus a variable intensity and in making use of electrical circuits which give, in the neighbourhood of the minimum a rapid intensity variation in the last stage or valve of the receiving system, a relay operated by the output of the last valve energizing electromagnets of a mechanical device hereafter described.

The method and apparatus of the present invention will be better understood from the following description of a preferred form of the device, with reference to the accompanying drawing in which:

Figure 1 is a diagram of the circuits;

Figure 2 is a diagram showing the effects obtained by the device;

Figure 3 shows a curve of the device; and

Figure 4 shows a form of construction of the apparatus.

The circuits comprise a detecting diode valve or any other rectifier, D, a five-grid valve E, a pentode valve F.

26 indicates the diode valve or the rectifier. One end of the high or mean frequency transformer is connected to the diode valve.

At the lower part of the transformer, a rectified alternating voltage for the modulation of the carrier wave is taken off, and passes through a capacity 1 into a potentiometer 2, at the ends of which this alternating voltage is taken off and is applied to the grid 29. An amplified alternating current is collected from the plate 28 which is supplied with direct current through a resistance 8. This voltage is taken up by means of a capacity 9, and can be used if desired for a listening control 30.

Independently of the alternating voltage taken from the lower part of the transformer, a direct current voltage, resulting from the rectifying of the carrier wave, is produced at the terminals of a resistance 3 interposed between the lower part of the transformer winding and the cathode of the diode valve.

This direct current is conducted over a shunt resistance 5, into the controlling grid of the five-grid valve E. In order to avoid placing any added alternating voltage upon this grid, a condenser 6 serves to take off all high or mean frequency currents which are not detected, and a capacity element 10 takes off the rectified modulated current which may have passed through the resistance 5.

The circuits of the five-grid valves E and the pentode valve F constitute the special method embodied in the apparatus.

If means are provided to produce a permanent plate current for the five-grid valve in the absence of all grid bias, by a suitable regulating of the voltages of the plate 17 and of the screen grid 15, when a negative bias is applied to the control grid 16, the plate current 17 is annulled.

Consequently, the drop of voltage at the ends of the resistance 11 is annulled, and a maximum voltage is available.

This voltage is applied to the screen grid 22 of the pentode valve F, and the plate current 24 of this valve becomes considerable (in fact, all variations of the positive bias of the screen grid 22 will cause variations in the plate current 24). When the positive bias of the screen grid 22 diminishes (which takes place when the plate current 17 of the five-grid valve increases, thus causing a drop of voltage in the resistance 11) the plate current 24 is annulled.

It is observed that by also varying the bias of the third grid 23 of the pentode valve, the plate current 24 is equally affected. Any positive variation of this grid bias will produce a corresponding increase of the plate current.

By adding the two effects of variation (whereof one is due to the increase of the positive bias of the screen grid 22 and the other is due to the increase of the voltage of the third grid 23), this will afford a still more rapid variation of the plate current. However, in order to obtain a very rapid effect, it is necesary to vary the bias of this grid in a different manner from that employed for the screen grid 22. Hence the said grid 23 should be controlled by a separate valve.

But it is found that when the current from the screen grid 15 of the five-grid valve remains practically the same, in spite of the variations of the bias applied to the controlling grid 16, and in spite of the variations in the output of the plate 17, the output of the said grid can be greatly varied, thus obtaining variations of tension at the terminals of the resistance 12. For this purpose, it is necessary to connect the controlling grid 16 to the grid 13 (which is usually arranged as an oscillating grid), and to leave the grid 14 without connections.

Any variation of the negative bias of the grids 16 and 13 will cause variations of the output of the screen grids 15 and the plate 17; variations of voltage are taken from the terminals of the resistances 11 and 12, and these variations are applied respectively to the grids 22 and 23 of the pentode valve 3, thus causing sudden variations of the output of the plate 24.

An example of the effect which is produced is shown in Figure 2. The ordinates represent the plate current 24 of the pentode valve F, indicated in milliamperes; the abscissae represent the negative volts applied to the grid 16 of the five-grid valve E. The corresponding curve is shown at G. In the case in which the grid 13 is connected in parallel with the grid 16, the corresponding curve is shown at H.

*Direct reading*

The above-mentioned plate current of the pentode valve F operates a relay 41 (such as a mechanical relay, "thyratron", or glow lamp) adapted to supply a current to a mechanism shown in Fig. 4 when the value of the signal received falls below a selected value.

Figure 3 shows the curve of the device by polar coordinates; the mechanism is released when the received current falls below the value r. A movable device rotates at the same speed as the aerial when the value of the received signal exceeds r, and it rotates at half this speed when this value is less than r. A spring brings the said device into the plane of the frame when the current rises to a value above r. A pointer is controlled by the said device, and it is only when a current is sent into the mechanism that the pointer is brought back to A (in the plane of the frame), and it is then moved at half-speed until the frame assumes the position B. The pointer is now released and is directed according to the bisecting line C, that is, in the direction perpendicular to the direction of the transmitter. By a suitable setting of the pointer on its shaft, the pointer can be placed in the direction of the transmitter, and a precision of 1 g. is obtained with this apparatus.

An apparatus of this character is set forth in the following description and is shown in Figure 4.

The shaft 31 is the shaft which supports the aerial, and it is driven by a motor 50.

By means of suitable gearing 45, the shaft 31 effects the rotation of the shaft 32 which rotates at half the speed, and by means of gearing 46 the shaft 33 is rotated at the same speed as the shaft 31.

The shaft 33 is hollow, and receives a shaft 34 carrying at its end a soft iron disc 35 located at a short distance from the electromagnet 36 which is mounted on the shaft 32. On the upper end of the shaft 34 is mounted an electromagnet 37. Between the pole-pieces of the electromagnet 37, a soft iron narrow bar armature mounted on the shaft 38 is adapted for free rotation when no current is flowing in the electromagnet. The armature and pole pieces of the electromagnet 37 are so proportioned that the shaft 38 will, when the electromagnet is energized, take up a position corresponding to the position of the pole pieces of the electromagnet. A pointer moving over a dial is mounted on the shaft 38.

The shaft 33 carries a disc provided with a stop pin 39 adapted for contact with an arm 40 secured to the shaft 34. A spring 40a normally under slight tension holds the arm 40 in contact with the stop pin 39, and in such direction that when the shaft 34 is stopped, the arm 40 may also remain in the position of rest, while the stop pin 39 and the shaft 33 continue to rotate.

The electromagnets 36 and 37 are connected in series with the relay 41 as shown in Fig. 1. In the absence of any current, the coil 37 which is mounted on the shaft 34 operated by the arm 40 which is urged by a spring against the arm 39, rotates at the same speed as the shaft 33, that is, at the same speed as the aerial. If a current passes in the electromagnets 36 and 37, the electromagnet 36 will rise, and contact the disc 35 and thereby rotate the latter at half the speed of the frame; the arm 40 separates from the stop 39 and remains behind, with regard to the direction of rotation, the latter as long as the electromagnet 36 and the disc 35 remain in contact.

When a current flows in the coils of the electromagnet 37, the plate mounted on the shaft 38 takes a position in the field of the electromagnet, and the pointer turns at half the speed of the aerial. When the current ceases to flow in the coils 36 and 37, the pointer remains in the position to which it has been moved; the spring brings the arm 40 against the stop 39, and the electromagnet 37 returns to its normal position with respect to the aerial.

I claim:—

An apparatus for measuring the direction of sources of radio-electric transmission comprising a rotating aerial, a first shaft, means for transmitting movement from the rotating aerial to the first shaft at the same speed as the aerial, a second shaft, a third shaft, means for transmitting movement to the third shaft from said aerial at half the speed of said aerial, said second and third shafts being coaxial with the first shaft, a first stop carried by the first shaft, a second stop carried by the second shaft, spring means for bringing said stops into contact, a rotating index having a shaft, a first electromagnet for coupling said second shaft with said third shaft, a second electromagnet for coupling said second shaft with the index shaft in always the same angular relation, and means for energizing said electromagnets in series when the intensity received by the aerial is below a predetermined limit.

ANDRÉ JACQUES CORRIEZ.